3,480,651
PREPARATION OF 2,5-SORBITAN

Ludwig A. Hartmann, Wilmington, Del., assignor to Atlas Chemical Industries, Inc., Wilmington, Del., a corporation of Delaware
No Drawing. Filed Mar. 31, 1967, Ser. No. 627,324
Int. Cl. C07c 45/24, 47/18; C13k 9/00
U.S. Cl. 260—347.8          11 Claims

ABSTRACT OF THE DISCLOSURE

A process of preparing pure crystalline 2,5-sorbitan from mannitol which comprises heating mannitol in the presence of an acid catalyst until from about 0.7 to about 1.7 mols of water, per mol of mannitol is formed. Substantially pure crystalline, 2,5-sorbitan may be recovered from the reaction mixture by acetalizing the mixture with an aldehyde or ketone, separating the acetalized 2,5-sorbitan by conventional separation techniques, and regenerating 2,5-sorbitan from the separated acetalized 2,5-sorbitan.

---

This invention relates to an improved process of preparing 2,5-sorbitan from mannitol. More particularly, this invention relates to an improved process of preparing substantially pure crystalline 2,5-sorbitan from mannitol.

A non-crystalline 2,5-sorbitan has been prepared in low yield from mannitol by the following process. Mannitol is mixed with benzoyl chloride and pyridine, heated on a steam bath for several days, and the reaction mixture poured over crushed ice. The solidified product is removed and recrystallized several times from alcohol to yield 1,6-dibenzoyl mannitol. The 1,6-dibenzoyl mannitol is mixed with acetylene tetrachloride containing toluene sulfonic acid and heated at reflux. The complex reaction product is then evaporated and crystallized to separate 1,6-dibenzoyl-2,5-sorbitan which may be saponified with dilute alkali and 2,5-sorbitan recovered as a syrup after purification and evaporation. The process is quite long, complex and not economically feasible.

It is accordingly, an object of this invention to provide a simple economically feasible process of preparing 2,5-sorbitan.

It is another object of this invention to provide a simple economically feasible process of preparing 2,5-sorbitan directly from mannitol.

It is another object of this invention to provide a simple economically feasible process of preparing 2,5-sorbitan in substantially pure and crystalline form.

Further objects of this invention will be apparent in the following description and in the appended claims.

It has been found, in accordance with the present invention that high yields of 2,5-sorbitan may be prepared directly from mannitol by heating mannitol in the presence of an acidic anhydrization catalyst until from about 0.7 to about 1.7 moles of water, per mole of mannitol, is formed. The predominance of ring-closure and inversion at carbon 2 or 5 in the absence of blocking groups at carbons 1 and 6, is completely unexpected.

Any known acidic dehydration catalyst, such as sulfuric acid, p-toluene sulfonic acid, hydrochloric acid, phosphoric acid, and the like, may be employed. As little as 0.01% by weight of acid exerts a catalytic effect although in the interest of shortening the reaction time it is preferred to employ upwards from 0.1%. Excessive amounts of acid, i.e., greater than about 5% are avoided to minimize the occurrence of undesired side reactions.

The temperature at which the anhydrization is generally conducted may range from about 110° C. to about 185° C.; however, any reaction temperature sufficient to effect the desired anhydrization may be used. A preferred temperature range is from about 125° C. to about 175° C.

As is apparent from the foregoing, the nature of the acidic dehydration catalyst, amount of catalyst, temperature, and pressure may vary widely. However, the amount of water of anhydrization formed per mole of mannitol is extremely critical. The amount of water of anhydrization formed is from about 0.7 to 1.7 moles and preferably from about 1.0 to about 1.5 moles. The most preferred amount of water removed is from about 1.2 to about 1.3 moles. When the amount of water formed is below about 0.7 or above about 1.7 moles, the yield of 2,5-sorbitan is so low that the process is no longer economically feasible. Moreover, when the amount of water formed is above about 1.7 moles, the polyol tends to polymerize to a hard tacky substance.

The preparation of 2,5-sorbitan from mannitol will be more readily understood from a consideration of the following examples which are given by way of illustration.

EXAMPLE 1

1000 grams of D-mannitol was placed in a two-liter, three-neck reaction flask provided with Claisen adapter, thermometer, stirrer, condenser, receiver, and Dry Ice trap. The charge was melted and stirred at 182° C. A solution of 2.5 grams concentrated sulfuric acid and 2.5 ml. water was slowly added at 175–178° C. After all the acid catalyst was added, the temperature was allowed to drop and water was distilled from the reaction mixture under vacuum. The temperature was adjusted to 150–155° C. at 30 mm. pressure and the reaction allowed to proceed for 33 minutes from the time the catalyst was added. Vacuum was then shut off and the product neutralized with 11.3 grams of 20% sodium hydroxide solution at 138° C. Additional water was removed at 180° C. and under vacuum for 17 minutes. The water removed corresponded to 1.24 moles of water per mole of mannitol charged. The product contained about 55%, by weight, of 2,5-sorbitan.

EXAMPLE 2

Example 1 was repeated except that the water removed corresponded to 1.48 moles per mole of mannitol charged. The product contained about 40%, by weight, of 2,5-sorbitan.

When mannitol is anhydrized by the process of the present invention, the reaction mixture contains in addition to 2,5-sorbitan, smaller amounts of isomannide, 1,4-mannitan, 1,5-mannitan and unreacted mannitol. By fractional distillation under reduced pressure, hexitans as a group can be separated from isomannide and unreacted mannitol. However, the hexitan fraction obtained is a mixture of several hexitans which, differing only in the spatial arrangement of the hydroxyl groups, cannot be fully resolved into its individual components by conventional methods of fractional distillation, crystallization, or extraction.

It has been found, in accordance with the present invention, that substantially pure 2,5-sorbitan may be recovered from the mixture of hexitans by acetalizing the mixture of hexitans, separating the acetalized 2,5-sorbitan by conventional separation techniques, and regenerating substantially pure 2,5-sorbitan from the separated acetalized 2,5-sorbitan. The acetalization is conveniently carried out by reacting the mixture of hexitans with an aldehyde or ketone in the presence of an acid catalyst.

The present separation process relies on the differential reactivity of sorbitans and mannitans toward aldehydes and ketones in the presence of acidic catalyst; while the 1,4-mannitan and 1,5-mannitan are known to form diaceals therewith, it was discovered that the 2,5-sorbitan forms monoacetals. The formation of diacetals requires the participation of all four available hydroxyl groups of the hexitan molecule. The formation of monoacetal from 2,5-sorbitan was found to utilize, selectively, only two hydroxyl groups and thus leave two hydroxyl groups unreacted. These differences in structure are reflected in pronounced differences in physical properties. Thus, the resulting components of the acetalization may be readily separated from each other and from polymeric residue by conventional separation methods, including fractional distillation, extraction, or crystallization.

The monoacetal of 2,5-sorbitan was found to have a substantially higher boiling point than the diacetals of 1,4-mannitan and 1,5-mannitan. Thus, the mixture is readily separated into its indivdual components by fractional distilaltion. In addition to differences in boiling points, the monoacetals and diacetals exhibit markedly different solubility characteristics. The diacetals are found to be soluble in non-polar solvents such as n-hexane, petroleum ether, and heptane whereas the monoacetal is insoluble in such solvents. A strongly polar solvent, such as water, readily dissolves the monoacetal and any unreacted polyol but is without effect on the diacetals. Somewhat less polar solvents, such as ethyl acetate, acetone, and ethyl ether, dissolve the monoacetal but are without effect on unreacted polyol or polymerized polyol. Based on these differential solubilties a fractional crystallization or an extraction process for separating the several components of the acetalized hexitan fraction can be readily set up.

Acid hydrolysis of the separated monoacetal of 2,5-sorbitan and subsequent crystallization or distillation yields 2,5-sorbitan of very high purity.

The aldehyde or ketone employed for the preparation of an acetal, in accordance with the present invention, may be any aldehyde or ketone which yield acetals of sorbitans and mannitans having pronounced differences in physical properties. Among the many aldehydes and ketones which are suitable for use in preparing the acetals of the present invention are formaldehyde, acetaldehyde, propionaldehyde, butyraldehyde, isobutyraldehyde, valeraldehyde, caproaldehyde, heptaldehyde, octanal, decanal, acrolein, chloral, acetone, methyl ethyl ketone, methyl n-propyl ketone, methyl isopropyl ketone, diethyl ketone, hexanone-2, hexanone-3, octanone-1, decanone-1, bromoacetone, acetylacetone, acetonylacetone, and methyl vinyl ketone.

When high molecular weight aldehydes and ketones are employed, the separation of boiling points of monoacetal and diacetal tends to be narrow making a fractionation by distillation somewhat difficult. In such cases, separation by extraction is preferred. However, when low molecular weight aldehydes and ketones are employed, the boiling points of monoacetal and diacetal are well separated and fractional distillation is the preferred method of separation. The lower aldehydes and ketones, such as those containing 1 to 6 carbon atoms, are preferred because they are less expensive than the higher molecular weight aldehydes and ketones and because fractional distilaltion is usually easier to perform on a large scale than fractional separation or crystallization which require large amounts of solvents. The preferred aldehyde is formaldehyde and the preferred ketone is acetone.

Among the many acid catalysts which are suitable for use in preparing the acetals are p-toluene sulfonic acid, sulfuric acid, hydrochloric acid, phosphoric acid, zinc chloride, cupric sulfate, phosphorus pentoxide, and ion-exchange resins in the acid form.

The process of separating substantially pure 2,5-sorbitan from its admitxure with mannitans will be more readily understood from a consideration of the following examples which are presented for illustrative purposes only.

EXAMPLE 3

The product of Example 2 was heated and distilled under vacuum. Isomannide distilled at 137-143° C. and 0.2-0.25 mm. pressure. The hexitan fraction distilled at 180-238° C. and 0.5 mm. pressure. The hexitan fraction was taken up in four volumes of boiling isopropanol and crystallized. Filtration yielded 123 grams of 1,4-mannitan. The mother liquor from the crystallization was evaporated and yielded 405 grams of a highly viscous syrupy mixture of hexitans. A 390 gram portion of this mixture was stirred with four liters of acetone in the presence of 30 grams of p-toluene sulfonic acid for 16 hours. 80 grams of anhydrous magnesium sulfate was then added and the resulting mixture allowed to stand at room temperature for 3 days. The product was then neutralized with 33 grams of calcium hydroxide and filtered. Upon evaporation of the filtrate under vacuum at 70° C. there were obtained 482 grams of product. The acetalized product was fractionally distilled under reduced pressure using a 15-inch column filled with Cannon packing. Diacetal of 1,4-mannitan was collected at 79-96.5° C. and 0.4 mm. pressure. Diacetal of 1,5-mannitan was collected at 96.5-117° C. and 0.4 mm. pressure. The monoacetal of 2,5-sorbitan distilled at 144-168° C. and 0.2-0.3 mm. pressure. This product was recrystallized from methyl ethyl ketone and yielded crystals melting at 95-97° C. and having a rotation of $(\alpha)_D^{20}+27°$ in ethanol. Hydrolysis of the monoacetal in dilute acetic acid solution followed by evaporation yielded substantially pure 2,5-sorbitan melting at 56-59° C. and having a rotation of $(\alpha)_D^{20}+24.4°$ in water. The residue remaining in the distillation flask was identified as 2,5-sorbitan which had not been acetalized. Additional monoacetal of 2,5-sorbitan was recovered from the distillation residue of the crude anhydro product by the above acetalization and separation route.

EXAMPLE 4

The product of Example 1 is fractionally distilled and the hexitan fraction reacted with formaldehyde in the presence of hydrochloric acid. Fractional distillation of the acetalized product results in the isolation of the monoacetal of 2,5-sorbitan. The monoacetal fraction is mixed with water and hydrochloric acid, heated on a steam bath, and ion-exchanged. The aqueous solution is evaporated on a water bath (70-80° C.) under aspirator vacuum to a viscous syrup. The syrup is dissolved in hot isopropanol-acetone and allowed to cool to room temperature. The crystals of pure 2,5-sorbitan which form are removed by filtration.

2,5-sorbitan is useful as an intermediate in the preparation of various products, such as in the preparation of surface active agents by esterification with fatty acids or fatty esters. Illustratively, one mol of 2,5-sorbitan may be reacted with one mol of a fatty acid, such as stearic acid, in the presence of a catalytic quantity of p-toluene sulfonic acid, such as 0.05% at approximately 200° C. in an inert atmosphere for about four hours to produce a surface active agent.

Although this invention has been described with reference to specific chemical materials, including specific anhydrization catalysts, aldehydes, ketones, acetalization catalysts, hydrolyzation catalysts, and solvents, as well as specific method steps, it will be appreciated that numerous other chemical materials may frequently be substituted for those described and that method steps may frequently be reversed or even eliminated, all within the spirit and the scope of this invention.

What is claimed is:

1. The process of preparing 2,5-sorbitan from mannitol which comprises heating mannitol in the presence of 0.01% to 5% by weight of an acidic anhydrization catalyst until from about 0.7 to about 1.7 mols of water, per mol of mannitol, is formed.

2. The process of claim 1 wherein the amount of water formed is from about 1 to 1.5.

3. The process of claim 1 wherein the amount of water formed is from about 1.2 to about 1.3.

4. The process of claim 1 wherein the temperature is from about 110° C. to about 185° C.

5. The process of claim 4 wherein the catalyst is selected from the group consisting of sulfuric acid and p-toluene sulfonic acid.

6. A process of preparing substantially pure 2,5-sorbitan from mannitol which comprises separating a mixture of hexitans composed solely of carbon, hydrogen, and oxygen atoms from the product resulting from the process of claim 1, acetalizing the mixture of hexitans with a compound selected from the group consisting of aldehydes and ketones, separating the monoacetal of 2,5-sorbitan from the acetalized mixture, and regenerating 2,5-sorbitan from the separated monoacetal of 2,5-sorbitan.

7. The process of claim 6 wherein the said compound is aliphatic and contains from 1 to 6 carbon atoms.

8. The process of claim 6 wherein the monoacetal of 2,5-sorbitan is separated from the acetalized mixture by fractional crystallization from a solvent.

9. The process of claim 6 wherein the monoacetal of the 2,5-sorbitan is separated from the acetalized mixture by fractional distillation.

10. The process of claim 6 wherein the monoacetal of the 2,5-sorbitan is separated from the acetalized mixture by fractional separation from a solvent.

11. A process of preparing substantially pure 2,5-sorbitan from mannitol which comprises separating a mixture of hexitans composed solely of carbon, hydrogen, and oxygen atoms from a product produced by the process of claim 1, reacting the separated mixture of hexitans with acetone in the presence of an acid acetalization catalyst, separating the monoacetonate of 2,5-sorbitan from the acetalized mixture by fractional distillation, and hydrolyzing the separated monoacetonate to 2,5-sorbitan.

References Cited

Percival: Structural Carbohydrate Chemistry, London, J. Garnet Miller, Ltd. (1962), p. 128–9.

Montgomery et al., J. Chem. Soc. (1948), pp. 2204–7.

Huckett et al., J.A.C.S., vol. 68 (1946), pp. 930–4.

ALEX MAZEL, Primary Examiner

BERNARD I. DENTZ, Assistant Examiner

U.S. Cl. X.R.

260—340.5, 340.9